United States Patent
Otake

(10) Patent No.: US 10,043,276 B2
(45) Date of Patent: Aug. 7, 2018

(54) IMAGE PROCESSING METHOD, IMAGE PROCESSING APPARATUS, ROBOT APPARATUS, PROGRAM, AND RECORDING MEDIUM

(71) Applicant: CANON KABUSHIKI KAISHA, Tokyo (JP)

(72) Inventor: Kazuki Otake, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 205 days.

(21) Appl. No.: 15/237,146

(22) Filed: Aug. 15, 2016

(65) Prior Publication Data
US 2017/0061626 A1  Mar. 2, 2017

(30) Foreign Application Priority Data
Sep. 1, 2015 (JP) .................................. 2015-171653

(51) Int. Cl.
| G06K 9/46 | (2006.01) |
| G06K 9/66 | (2006.01) |
| G06T 7/00 | (2017.01) |

(52) U.S. Cl.
CPC .......... *G06T 7/0042* (2013.01); *G06K 9/4671* (2013.01); *G06T 2207/10004* (2013.01)

(58) Field of Classification Search
CPC ..................... G06K 9/4671; G06T 2207/10004
See application file for complete search history.

(56) References Cited

U.S. PATENT DOCUMENTS

| 2003/0053714 A1* | 3/2003 | Esaki | .................... G06K 9/4604 382/287 |
| 2005/0232493 A1* | 10/2005 | Satou | ...................... G06T 7/001 382/209 |

FOREIGN PATENT DOCUMENTS

| JP | 2003-60888 A | 2/2003 |
| JP | 2011-43922 A | 3/2011 |

* cited by examiner

*Primary Examiner* — Phuoc Tran
(74) *Attorney, Agent, or Firm* — Fitzpatrick, Cella, Harper & Scinto

(57) ABSTRACT

An image processing method of reduced an amount of calculation in pattern matching processing, using a reference image. A computer sets searching regions on the input image so as to correspond to a plurality of distributed regions of the work positions to be detected on the input image, respectively, detects the predetermined number of work positions by performing the pattern matching processing by using the reference image in the continuous searching regions, on a predetermined number of input images, and determines distribution of the work positions on the input images, based on the predetermined number of the work positions which have been detected and detects the work positions by performing the pattern matching processing by using the reference image, in the plurality of searching regions which have been set in the setting process, and determining an evaluation value of pattern matching, every time the pattern matching processing is performed.

16 Claims, 10 Drawing Sheets

IMAGE PROCESSING METHOD, IMAGE PROCESSING APPARATUS, ROBOT APPARATUS, PROGRAM, AND RECORDING MEDIUM

BACKGROUND OF THE INVENTION

Field of the Invention

The present invention relates to an image processing method which performs pattern matching processing with the use of a reference image, an image processing apparatus, a robot apparatus, a program, and a recording medium.

Description of the Related Art

An image processing apparatus which performs pattern matching processing with the use of a reference image in a searching region that is set on an input image to detect a work position on the input image, and a robot apparatus provided with the image processing apparatus are widely used.

In the pattern matching processing with the use of the reference image, the image processing apparatus repeats a calculation of shifting the position and angle of the reference image little by little in the searching region that has been set on the input image, and determining the evaluation value of the pattern matching. Because of this, if the searching region is large, an amount of calculation becomes enormous, and a calculating time is extended before the work position on the input image is determined. In addition, in order to enhance the precision of the pattern matching processing with the use of the reference image, it is necessary to reduce an increment width of the position and inclined angle at which the pattern matching processing with the use of the reference image is performed in the searching region. In addition, also in the case where the increment width of the position and inclined angle is made small at which the pattern matching processing is performed in the searching region, the amount of calculation becomes enormous, and the calculating time for the work position on the input image to be established is extended.

Then, in Japanese Patent Application Laid-Open No. 2003-60888, the image reading apparatus performs pattern matching processing by using the reference image in a strip-shaped searching region which has been previously set on the input image based on an imaging rule of the input image, and thereby reduces the amount of calculation in the pattern matching processing.

In addition, in Japanese Patent Application Laid-Open No. 2011-43922, the mobile-object recognizing apparatus continuously images a mobile object, estimates the position of the mobile object, and performs the pattern matching processing by using the reference image in the searching region which regards the estimated position as a center, and thereby reduces the amount of calculation of the pattern matching processing.

There is the case where the work positions in the input image of a work held by a holding unit imaged by an imaging unit appear preferentially in a plurality of distributed regions on the input image. In this case, if the pattern matching processing with the use of the reference image is performed on all of the work positions in the searching region, as are described in Japanese Patent Application Laid-Open No. 2003-60888 and Japanese Patent Application Laid-Open No. 2011-43922, pattern matching processing results in being executed many times, which has no possibility of detecting the work position, in a region among the plurality of distributed regions.

The present invention relates to: an image processing method which can reduce an amount of calculation in pattern matching processing with the use of a reference image, in the case where work positions to be detected on an input image appear preferentially in a plurality of portions; an image processing apparatus; a robot apparatus; a program; and a recording medium.

SUMMARY OF THE INVENTION

According to an aspect of the present invention an image processing method by which an arithmetic operation unit performs image processing on an input image in which work positions in the input image of a work held by a holding unit imaged by an imaging unit appear preferentially in a plurality of distributed regions on the input image, comprises: a setting process in which the arithmetic operation unit sets searching regions on the input image so as to correspond to the plurality of distributed regions, respectively; and a detecting process in which the arithmetic operation unit detects the work position by performing pattern matching processing by using a reference image, in a plurality of searching regions that have been set in the setting process, wherein, in the detecting process, the arithmetic operation unit determines an evaluation value of pattern matching, every time the pattern matching processing is performed.

An image processing method according to one exemplary embodiment of the present invention includes setting searching regions on an input image so as to correspond to a plurality of distributed regions, respectively. Because of this, the method can reduce an amount of calculation in pattern matching processing with the use of a reference image, in the case where work positions to be detected on an input image appear preferentially in a plurality of portions.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

Robot Apparatus

Figure 1:
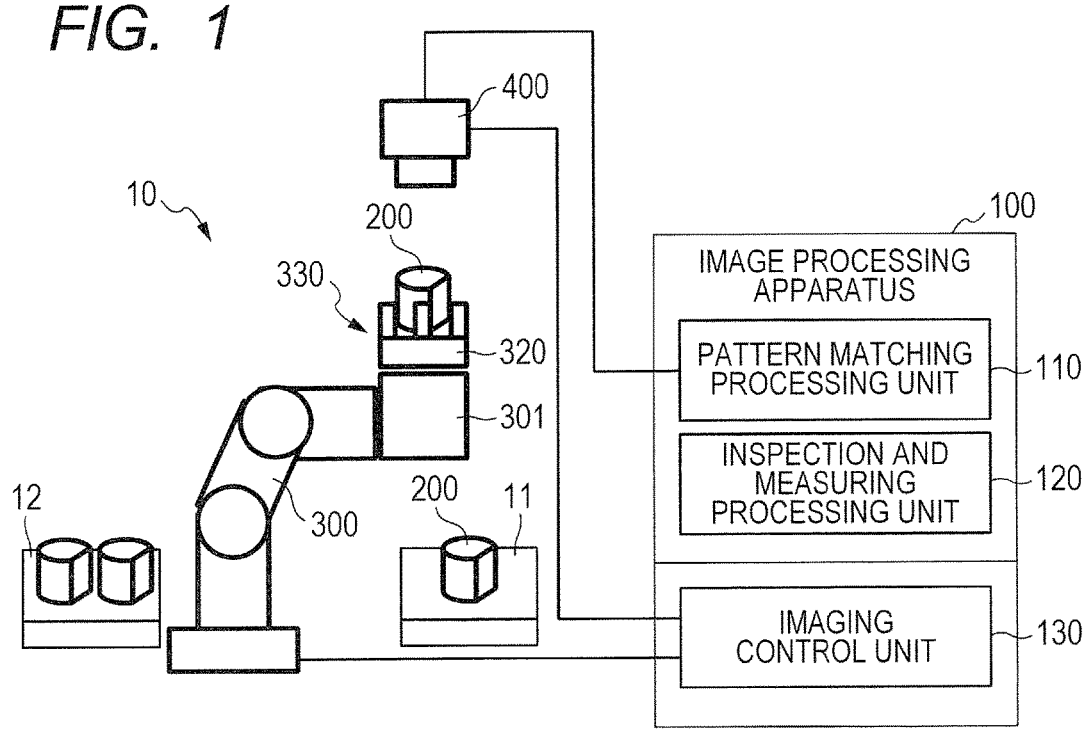
FIG. 1 is an explanatory view of a structure of a robot apparatus in Embodiment 1.

FIG. 1 is an explanatory view of a structure of a robot apparatus in Embodiment 1. As is illustrated in FIG. 1, a robot apparatus 10 is a production facility which grasps a work 200 that is randomly loaded on a workbench 11 with a robot arm 300 of a multi-joint robot, images and inspects the work 200, and then arrays the work 200 on a workbench 12 so that the directions of the works are aligned.

The robot arm 300 grasps the work 200 with a three-claw grasping mechanism 330 which is provided on the head, and moves the work 200 to an imaging position directly below an imaging apparatus 400. The imaging apparatus 400 is a camera for imaging the work 200 which is in a state of being grasped by the three-claw grasping mechanism 330.

An imaging control unit 130 makes the robot arm 300 grasp the work 200 and move the work 200 to the imaging position from the workbench 11, and makes the imaging apparatus 400 image an end face of the work 200 and acquire the imaged image. The image processing apparatus 100 acquires the imaged image of the work from the imaging apparatus 400, and executes image processing which includes pattern matching processing on the imaged image of the work, which has been acquired.

A pattern matching processing unit 110 subjects the imaged image of the end face of the work 200 to the pattern matching processing with the use of the reference image, and detects the work position on the imaged image. An inspection and measuring processing unit 120 inspects the work 200 based on the pattern matching processing result of the pattern matching processing unit 110.

As has been described above, the robot apparatus 10 has a robot arm 300 which is one example of a multi-joint robot. The robot arm 300 has the three-claw grasping mechanism 330 which is one example of the holding unit. The imaging apparatus 400 which is one example of the imaging unit images the work 200 that is held by the three-claw grasping mechanism 330. The robot apparatus 10 makes the imaging apparatus 400 image the work every time the three-claw grasping mechanism 330 holds the work, and acquire the input image.

(Three-Claw Grasping Mechanism)

Figure 2:
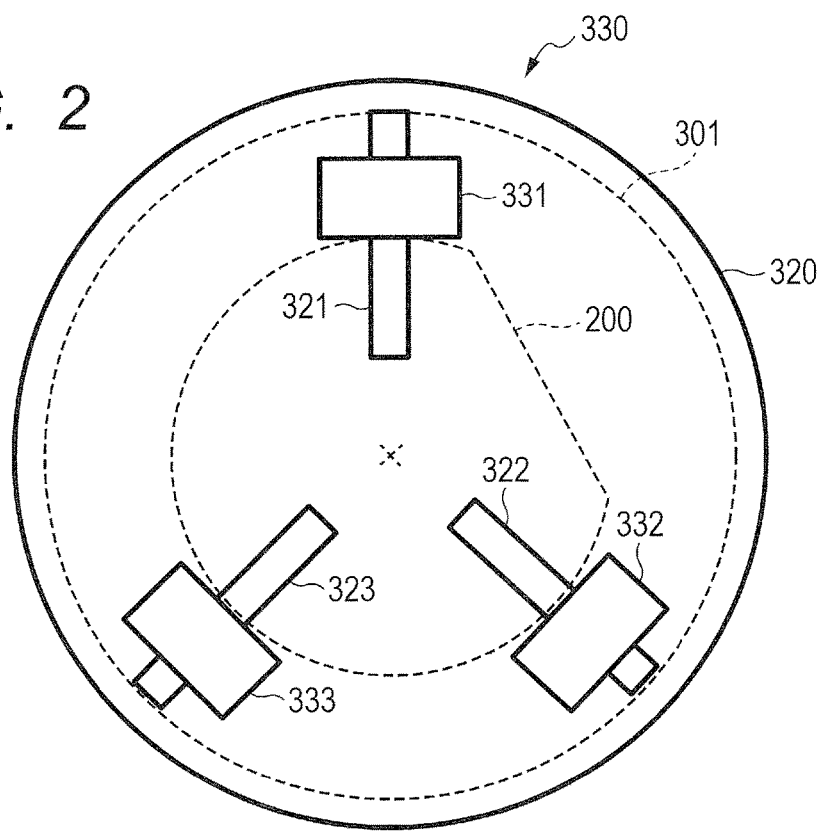
FIG. 2 is an explanatory view of a grasping mechanism which uses three claws.

FIG. 2 is an explanatory view of the grasping mechanism with the use of three claws. FIGS. 3A to 3D are explanatory views of states in which the work is grasped by the three-claw grasping mechanism. FIG. 4 is an explanatory view of distribution of center positions of the work.

As is illustrated in FIG. 2, the three-claw grasping mechanism 330 has a claw base 320 rotatably mounted on the head of an arm 301. Three claws 331, 332 and 333 are mounted on the claw base 320 so as to be capable of being moved in a diameter direction along guide grooves 321, 322 and 323. The work 200 has a columnar shape having a D-cut face 210, and the end face is positioned at the imaging position in a state of being grasped by the three claws 331, 332 and 333.

As is illustrated in FIG. 1, the robot arm 300 moves the claw base 320 to the imaging position directly below the imaging apparatus 400, and positions the end face of the work 200 at a predetermined focal position which is determined to face the imaging apparatus 400. The robot arm 300 rotates the claw base 320, and thereby positions the three claws 331, 332 and 333 at the same angle positions in the surface of revolution of the claw base 320.

At this time, as is illustrated in FIGS. 3A to 3D, a center position (x mark) through which an axis of rotation on the end face of the work 200 passes that is grasped by the claws 331, 332 and 333 moves according to the angle position of the D-cut face 210.

Figure 3:
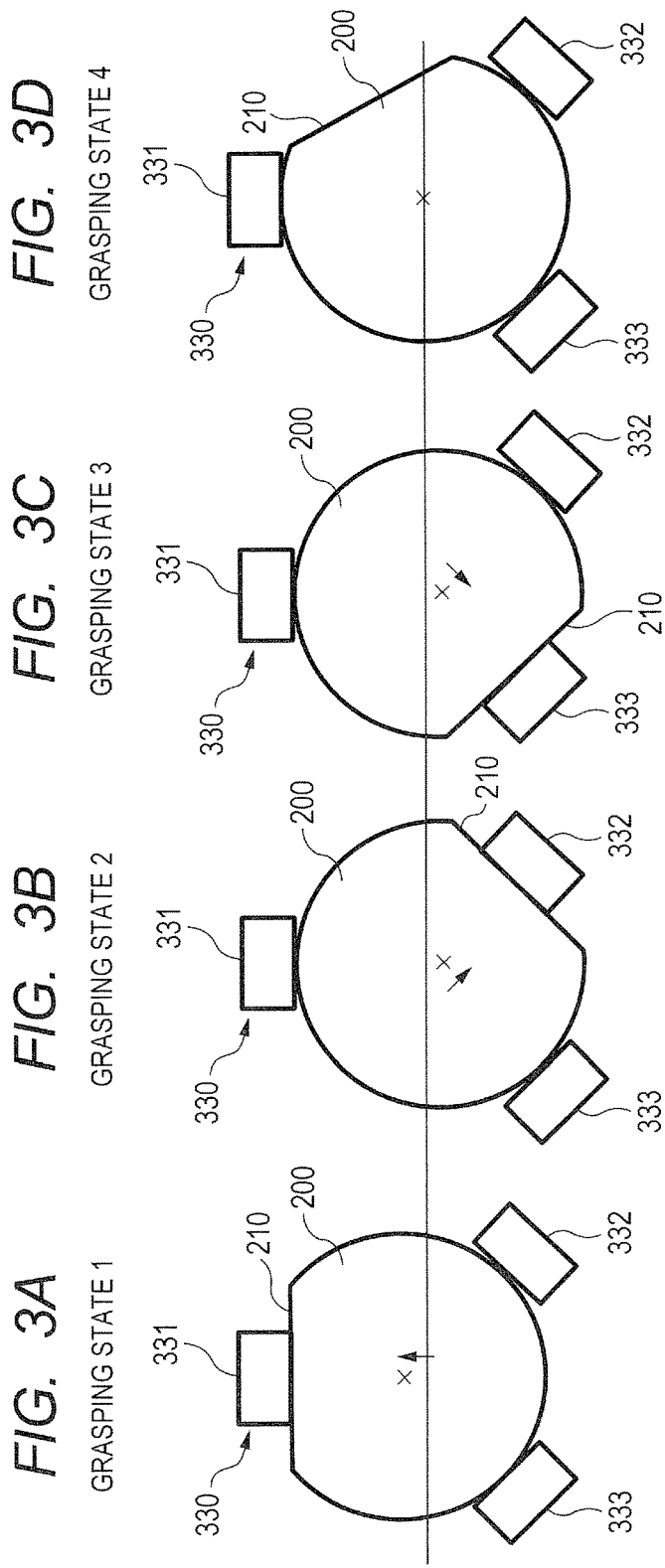
FIGS. 3A, 3B, 3C and 3D are explanatory views of states in which a work is grasped by the three-claw grasping mechanism.
Figure 4:
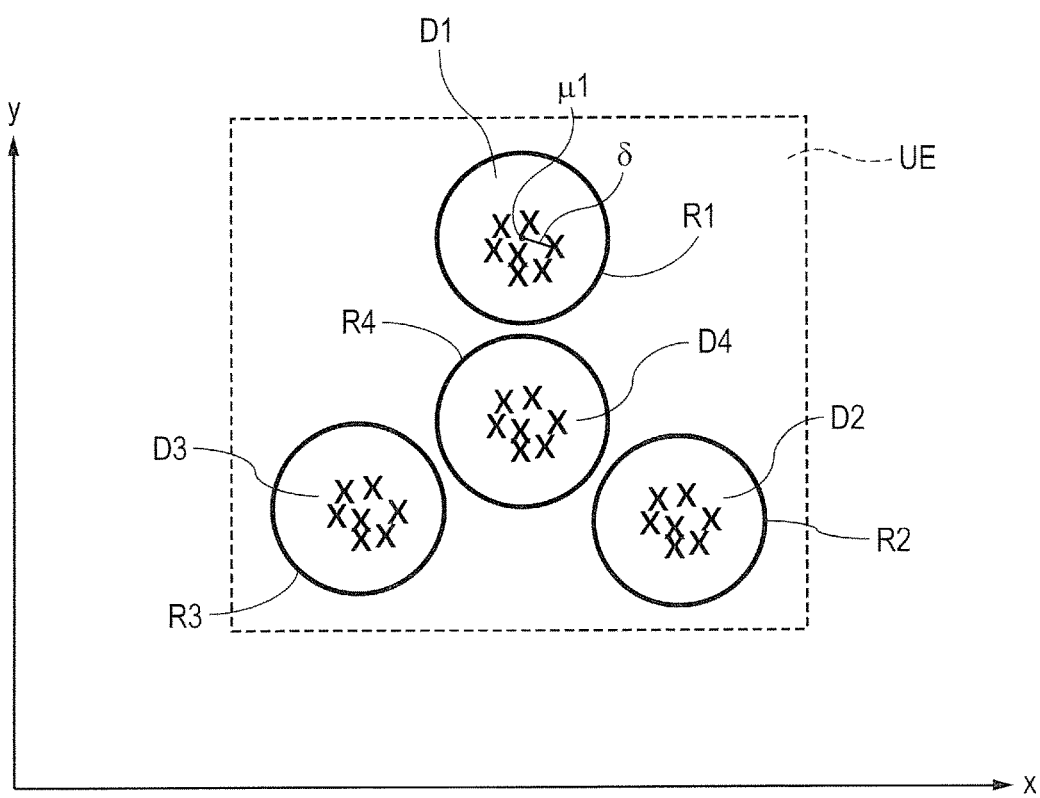
FIG. 4 is an explanatory view of distribution of center positions of the work.

(1) FIG. 3A is a grasping state 1 where the claw 331 touches the D-cut face 210. In the grasping state 1, the work 200 is grasped in a state in which the center of the work is displaced to the claw 331 side.

(2) FIG. 3B is a grasping state 2 in which the claw 332 touches the D-cut face 210. In the grasping state 2, the work 200 is grasped in a state in which the center of the work is displaced to the claw 332 side.

(3) FIG. 3C is a grasping state 3 in which the claw 333 touches the D-cut face 210. In the grasping state 3, the work 200 is grasped in a state in which the center of the work is displaced to the claw 333 side.

(4) FIG. 3D is a grasping state 4 in which any of the claws 331, 332 and 333 does not touch the D-cut face 210. In the grasping state 4, the axis of rotation of the work 200 is positioned at the center position of the three-claw grasping mechanism 330.

As a result, in the case where the work has been randomly grasped and repeatedly imaged, the work centers (position of axis of rotation) X are distributed in four positions on the imaged image, as are illustrated in FIG. 4. There are four grasping states in the case where the D-cut-shaped work 200 has been grasped by the three-claw grasping mechanism 330, and the imaging positions of the end face of the work are displaced according to the respective grasping states. Accordingly, the distributions of the work center X are divided into four. Specifically, in the robot apparatus 10, the work positions on the input image in which the work 200 that is held by the three-claw grasping mechanism 330 is imaged by the imaging apparatus 400 appear preferentially in a plurality of distributed regions on the input image.

Then, in Embodiment 1, the robot apparatus 10 measures the distribution of the work centers X, and sets priority searching regions R1, R2, R3 and R4 on the imaged image so as to correspond to the measured distribution. Then, the robot apparatus 10 performs the pattern matching processing in the priority searching regions R1, R2, R3 and R4, and only when having been uncapable of detecting the work position, performs the pattern matching processing in a normal searching region UE except the priority searching regions. Thereby, the robot apparatus 10 greatly reduces the number of calculations which are performed before the pattern matching processing succeeds, compared to the case where the pattern matching processing is performed in the whole normal searching region UE.

(Image Processing Apparatus)

Figure 5:
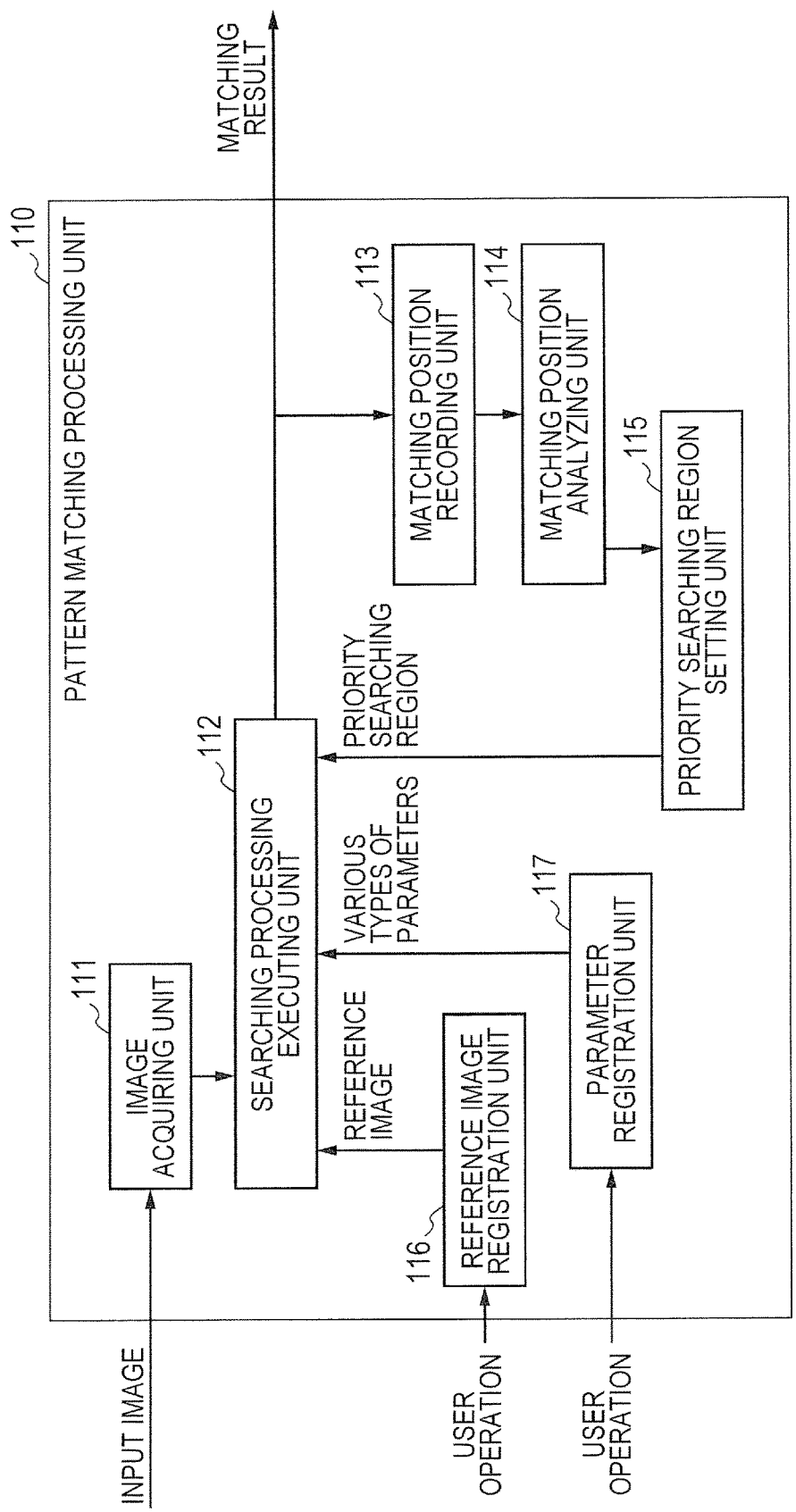
FIG. 5 is a functional block diagram of pattern matching processing.
Figure 6:
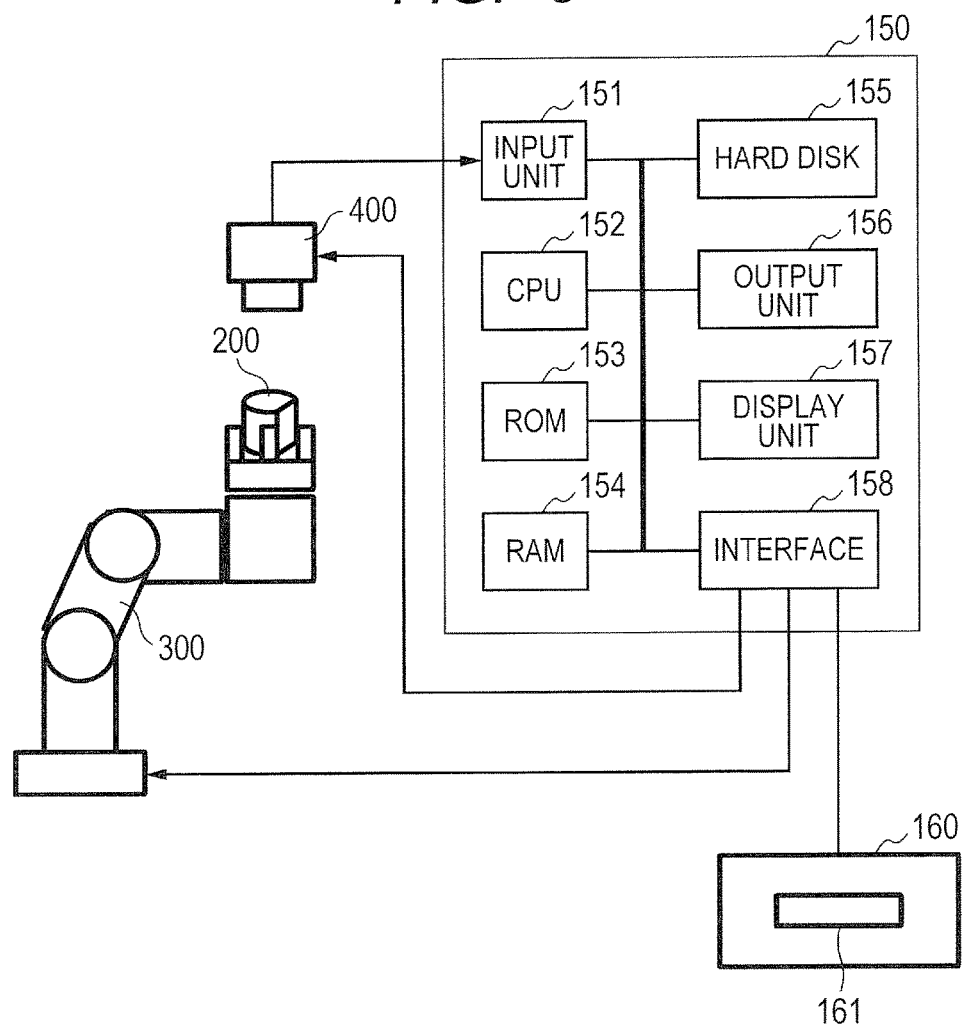
FIG. 6 is an explanatory view of a hardware configuration of the robot apparatus.

FIG. 5 is a functional block diagram of pattern matching processing. FIG. 6 is an explanatory view of a hardware configuration of the robot apparatus. As is illustrated in FIG. 5, an image acquiring unit 111 acquires an input image from the imaging apparatus (400: FIG. 1).

A pattern matching processing unit 110 performs pattern matching processing on the input image by using a reference image, and detects a matching position and matching angle of the reference image in relation to the imaged image on the input image. A searching processing executing unit 112 executes the pattern matching processing by using the reference image. A matching position recording unit 113 records the matching position. A matching position analyzing unit 114 analyzes the distribution of the past matching positions. The priority searching region setting unit 115 sets the plurality of priority searching regions on the input image. A reference image registration unit 116 registers the reference image. A parameter registration unit 117 registers various types of parameters necessary for the pattern matching processing.

As is illustrated in FIG. 6, a CPU 152 in a computer 150 is bus-connected with components such as a ROM 153, a RAM 154, a hard disk 155, an interface 158, an input unit 151, an output unit 156 and a display unit 157. The imaging apparatus 400 images the work 200, and converts the imaged image into digital data. The image data of the imaged image in the imaging apparatus 400 is input to the input unit 151.

The CPU 152 is formed of a microprocessor, and performs the calculation and processing of data. The CPU 152 executes a program which is stored in the ROM 153, receives data from the RAM 154, the hard disk 155, the input unit 151 and the like, calculates the received data, and outputs the calculated data to the display unit 157, the hard disk 155, the output unit 156 and the like.

The ROM 153 stores the program and data of various types of control therein. The RAM 154 is used for a temporary storage of data for processing which the CPU 152 executes, and the like. The hard disk 155 is a storage apparatus which holds a large size of data such as data of the imaged image and the reference image (template).

The interface 158 mutually converts between the data and various types of signals, and controls the imaging apparatus (camera) 400 and the robot arm 300 through signal lines. The interface 158 can read a program from an optical disk 161 of a recording medium through a disk drive 160. The interface 158 communicates with an external server, computer and communication instrument through an optical fiber, a LAN cable and the like.

The display unit 157 outputs an image signal to a CRT display, a liquid crystal display, a plasma display or the like, and displays the image thereon. The input unit 151 receives also an operation input sent from a pointing device such as a keyboard, a touch panel and a mouse. The output unit 156 has an output terminal for outputting data.

(Prior Processing)

Figure 7:
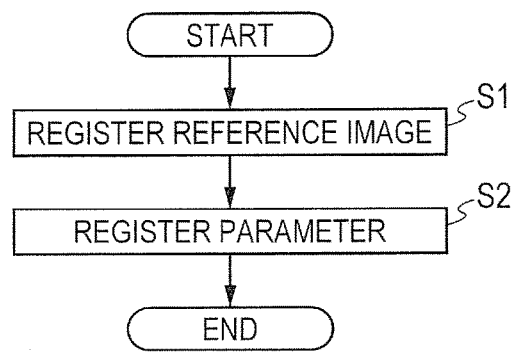
FIG. 7 is a flow chart of a prior processing of the pattern matching processing.

FIG. 7 is a flow chart of prior processing of the pattern matching processing. As is illustrated in FIG. 5, the reference image registration unit 116 and the parameter registration unit 117 perform the prior processing of the pattern matching processing unit 110, and set the reference image, the parameter and the like necessary for the pattern matching processing, before the pattern matching processing starts. A user can change a part or all of these parameters through the reference image registration unit 116 and the parameter registration unit 117.

As is illustrated in FIG. 7, the reference image registration unit 116 selects an appropriate reference image according to the type and imaging condition of the work 200, which are designated by a user, from among the plurality of reference images that are previously prepared, and registers the selected reference image in the reference image registration unit 116 (S1).

The parameter registration unit 117 selects the optimal selected choice for the pattern matching processing in the type and imaging condition of the work 200, which are designated by a user, from among a plurality of selected choices of various types of parameters that are previously prepared, and registers the optimal selected choice in the parameter registration unit 117 (S2).

(Normal Score Threshold Value)

The position of the reference image is referred to as a matching position, at which the similarity between the input image and the reference image becomes highest, when the pattern matching processing is performed in the searching region that has been set on the input image, and the similarity at this time is referred to as a matching score. The score threshold value is a threshold value that specifies how many or more is the largest matching score in the searching region, which is considered to be success in matching. The normal score threshold value is a threshold value of the matching score which is an evaluation value of the pattern matching, in Embodiment 1.

(Normal Searching Angle)

The angle of the reference image is referred to as a matching angle, at which the similarity between the input image and the reference image becomes highest, when the pattern matching processing is performed within a searching angle in one position in the searching region. The searching angle is a parameter that specifies how wide is the range of the inclination, in which the pattern matching processing of the reference image is performed at each position in the searching region. The normal searching angle is an angle range in which the pattern matching processing is executed at each of the positions on the imaged image, in Embodiment 1.

(Normal Searching Scale)

The scale of the reference image is referred to as a matching scale, at which the similarity between the input image and the reference image becomes highest, when the pattern matching processing is performed at one angle at one position in the searching region while the reference image is expanded or shrunk in the searching scale. The searching scale is a parameter that specifies how wide is the range of the expansion and shrinkage, in which the pattern matching processing is performed while the reference image is expanded or shrunk. The scale of the normal searching is a range in which the reference image is expanded or shrunk when the pattern matching processing is performed at one angle at one position in the searching region, in Embodiment 1.

(Normal Searching Region)

The normal searching region is the largest range that is set on the imaged image and in which the pattern matching processing is performed. The normal searching region is a parameter that specifies the range on the imaged image, in which the pattern matching processing is executed. The normal searching region is a parameter that specifies the range in which the center of the reference image moves in the pattern matching processing. The normal searching region is set to be large so that the pattern matching processing unit can detect the work 200 which is an object to be detected even when any variation has occurred, in consideration of all of the variations in an accuracy of repeated positioning by the robot arm 300, the dispersion originating in a change with time, and the like.

(Number of Past Information References)

The number N of past information references is the number of the total of the work centers x illustrated in FIG. 4. Specifically, the number is a numerical value showing how many times the past matching positions (x) are referred when priority searching regions R1, R2, R3 and R4 are set.

(Reference Image and Imaged Image)

Figure 8:
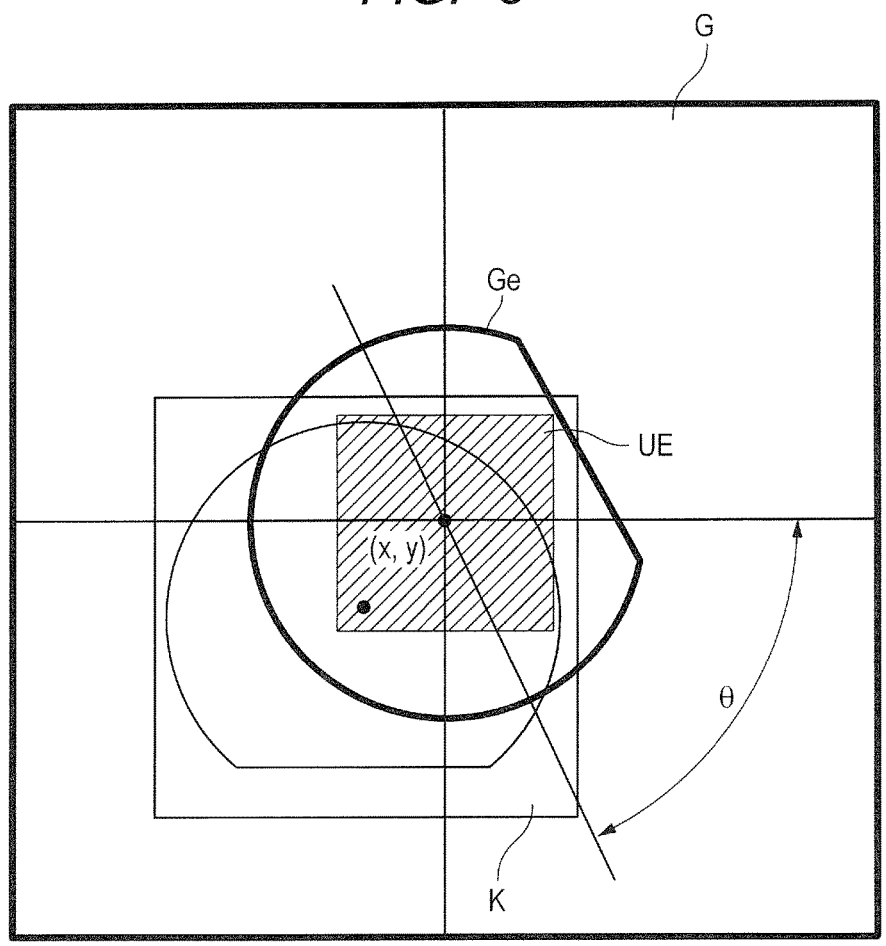
FIG. 8 is an explanatory view of the pattern matching processing.

FIG. 8 is an explanatory view of the pattern matching processing. As is illustrated in FIG. 8, the pattern matching processing unit subjects the imaged image G of the work 200 to the pattern matching processing with the use of a reference image K, and determines coordinate positions x and y on the imaged image, at which the imaged image G matches the reference image K, and an inclination angle θ of the reference image K. Here, in order to simplify the description, the reference image (template) K positions the work center at the center of the reference image K, with the use of a contour of the whole work, which is an edge image of the end face of the work 200 and of a circle which has a D-cut. However, practically, the reference image K is a part of the contour of the work, in order to reduce the amount of calculation.

As is illustrated in FIG. 8, the searching processing executing unit 112 extracts an edge image Ge from the imaged image, and subjects the extracted edge image Ge to the pattern matching processing with the use of the reference image K. Then, the searching processing executing unit 112 determines the coordinate positions x and y of the center position and the inclination angle θ of the work 200, which is the work position on the imaged image G.

The image processing apparatus 100 determines a matching score which is one example of an evaluation value of the pattern matching, every time the pattern matching processing is performed. When performing the pattern matching processing in the normal searching region UE on the imaged image G, the image processing apparatus 100 performs the pattern matching processing at each position of each pixel in the normal searching region UE, and determines each of the matching scores which are evaluation values of the similarity between the imaged image G and the reference image K. Then, the image processing apparatus 100 outputs the coordinate positions x and y and the inclination angle θ at which the similarity to the reference image K becomes highest, which is evaluated by the matching score, as the work position. Alternatively, when the matching score is larger than the score threshold value, the image processing apparatus 100 considers that the matching has succeeded, and outputs the work position as the data x and y and the inclination angle θ.

The pattern matching processing unit 110 extracts the edge from all of the pixels on the imaged image G, and creates the edge image Ge. Subsequently, the pattern matching processing unit 110 subjects the created edge image Ge to the pattern matching processing with the use of the reference image K, determines the matching score, and thereby evaluates the degree of matching between the patterns of the reference image K and the edge image Ge, at the inclination angle at the position on the edge image Ge.

(Setting of Priority Searching Region)

Figure 9:
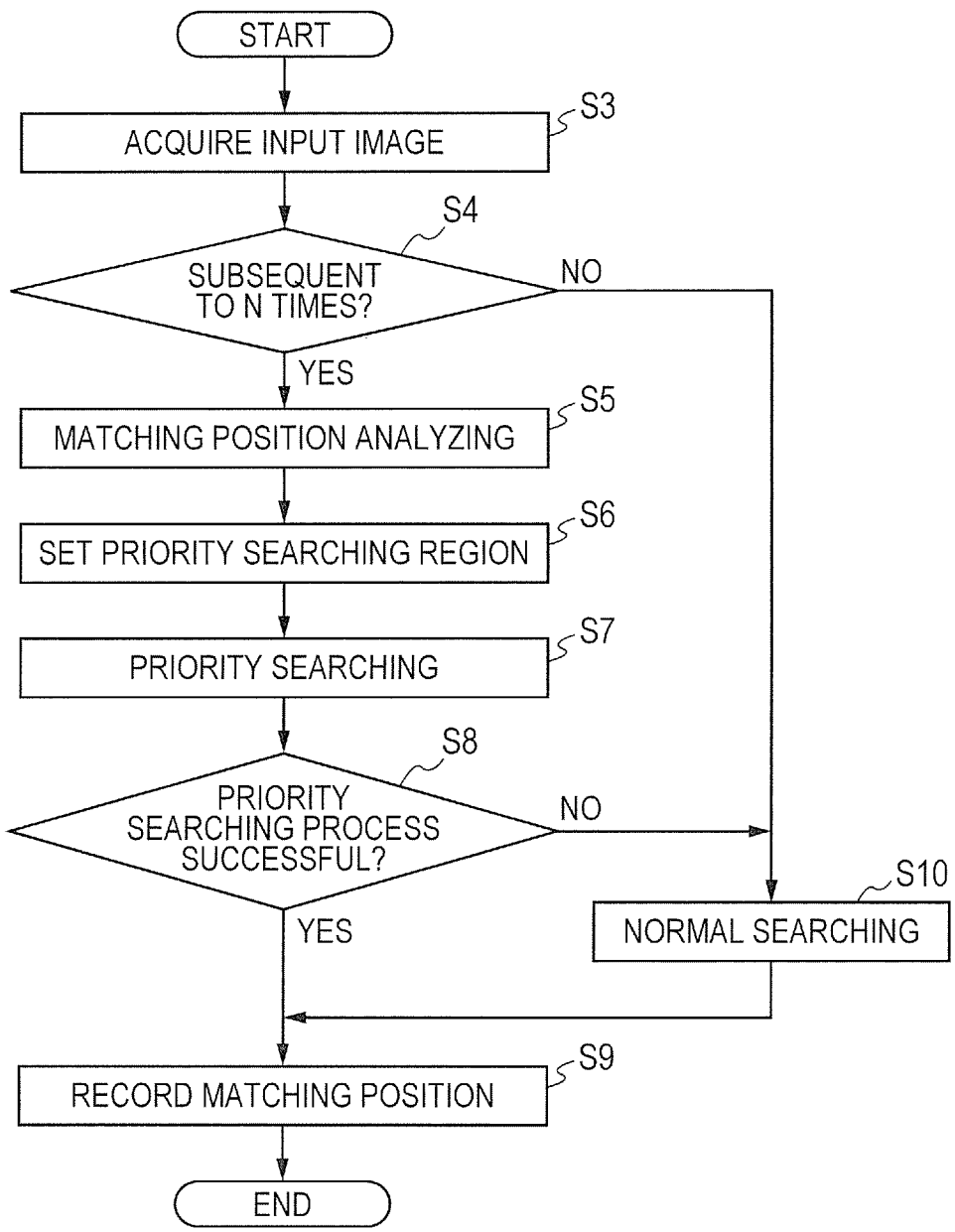
FIG. 9 is a flow chart of the pattern matching processing of Embodiment 1.

FIG. 9 is a flow chart of the pattern matching processing in Embodiment 1. As is illustrated in FIG. 4, in Embodiment 1, the priority searching region setting unit 115 sets the plurality of priority searching regions R1, R2, R3 and R4 in the inside of the normal searching region UE which a user has set, and executes the pattern matching processing.

As is illustrated in FIG. 9 with reference to FIG. 6, a computer 150 acquires the imaged image of the work 200 that is an object to be measured, which has been imaged by the imaging apparatus 400, as the input image (S3).

The computer 150 counts the present number m of times, which indicates what number of input image the present input image is, and determines whether or not the present number m of times has exceeded the number N of past information references, which is set in the prior processing (S4).

The computer 150 continues the normal searching processing until the present number m of times exceeds the number N of past information references (N≥m, No in S4) (S10). The computer 150 searches the work position in the whole normal searching region UE illustrated in FIG. 4, with the use of parameters of a normal score threshold value, a normal searching angle and a normal searching scale which a user has set in the prior processing. The computer 150 sets the normal searching region UE in the acquired input image, performs the pattern matching processing with the use of the reference image K, and records the coordinate positions x and y and the inclination angle θ at which the similarity (matching score) to the reference image K becomes highest, as the work position.

When the present number m of times exceeds the number N of past information references (N<m, Yes of S4), the computer 150 executes the analysis of the distribution state of the work positions (S5).

The computer 150 clusters the work positions, based on the analysis result of the distribution state of m pieces of the work positions. In addition, as is illustrated in FIG. 4, the computer 150 sets priority searching regions R1, R2, R3 and R4 for each of the distributions D1, D2, D3 and D4 of the clustered work positions (S6).

The computer 150 executes the pattern matching processing with the use of the reference image K, in the inside of the priority searching regions R1, R2, R3 and R4 (S7).

When having succeeded in the pattern matching processing in the inside of the priority searching regions R1, R2, R3 and R4 (Yes in S8), the computer 150 records the coordinate positions x and y and the inclination angle θ at which the computer 150 has succeeded in the pattern matching, as the work position (S9).

When the computer 150 cannot have found the work position in the priority searching regions R1, R2, R3 and R4 (No in S8), the computer 150 progresses to the normal searching processing (S10). At this time, in order to avoid duplication of the searching regions, the computer 150 sets such a searching region that the priority searching regions R1, R2, R3 and R4 are removed from the normal searching region UE, on the input image, and performs the pattern matching processing there with the use of the reference image K. Then, the computer 150 records the coordinate positions x and y and the inclination angle θ at which the matching score becomes highest, as the work position.

When having succeeded in the priority searching processing and also when having succeeded in the normal searching processing, the computer 150 records the coordinate positions x and y at the time when having succeeded in the pattern matching processing, up to the results of the latest past N times (S9). At the time of recording, the computer 150 performs FIFO (First In First Out) processing, records data xm of new position information, and simultaneously deletes older data xm-N than the number N of past information references. Thereby, as is illustrated in FIG. 4, the barycentric positions of the priority searching regions R1, R2, R3 and R4 are corrected little by little, and the priority searching regions R1, R2, R3 and R4 are kept so as to correspond to the latest distributions D1, D2, D3 and D4.

At the time when having been capable of detecting the position which coincides with the reference image on the input image, in other words, when having succeeded in searching, the computer 150 considers that the priority searching processing has succeeded and ends the priority searching processing. However, when having failed in the priority searching processing, the computer 150 executes the normal searching processing. In addition, when having failed in the searching of the work position even in the normal searching processing, the computer 150 considers that the searching processing has failed, stops the robot apparatus 10, and outputs an alarm.

As is illustrated in FIG. 5, the matching position recording unit 113 records the data xm of the matching position at the time when the pattern matching processing unit has succeeded. At the time of recording, the matching position recording unit 113 performs the FIFO (First In First Out) processing, and when recording the data xm of the new position information, deletes the older data xm-N than the number N of past information references. Thereby, the matching position recording unit 113 holds the matching position information xi (i=m-N, . . . , m-1) which corresponds to N pieces of the latest past information references.

The matching position analyzing unit 114 acquires the latest matching position information xi (i=m-N, . . . , m-1) from the matching position recording unit 113. The matching position analyzing unit 114 performs a cluster analysis of the matching position information xi (i=m-N, . . . , m-1) with the use of a hierarchy clustering method. Any of a group average method, a Ward method, a shortest distance method and a longest distance method may be used as a distance measurement method at the time when the cluster analysis is performed.

The matching position analyzing unit 114 divides the clusters based on the threshold value of a distance between clusters, which the user has designated beforehand. In this way, the N pieces of the matching positions are divided into the four distributions D1, D2, D3 and D4, as is illustrated in FIG. 4.

The priority searching region setting unit 115 executes the priority searching region setting processing, and sets the priority searching regions R1, R2, R3 and R4 each for each of the clustered distributions D1, D2, D3 and D4.

The priority searching region setting unit 115 firstly calculates a barycentric position $\mu 1$ of all the positions which belong to the distribution D1, and a standard deviation $\sigma 1$ of distances from the barycenter. Then, the priority searching region setting unit 115 sets a circular region of which the center is $\mu 1$ and the radius is $5\sigma 1$, as the priority searching region R1. As is illustrated in FIG. 4, the priority searching region setting unit 115 sets one priority searching region R1 as the circular region which regards the barycenter $\mu 1$ of the work positions in one group of the work positions as the center, and has the radius of 5 times as large as the standard deviation of the distances between the barycenter in one group and each of the work positions.

The priority searching region setting unit 115 similarly sets the priority searching regions R2, R3 and R4 for the distributions D2, D3 and D4.

As has been described above, in the image processing apparatus 100, the computer 150 which is one example of an arithmetic operation unit executes the processing of the priority searching region setting unit 115, which is one example of a setting process, and the processing of the searching processing executing unit 112, which is one example of a detecting process. The priority searching region setting unit 115 sets the searching regions on the input image so as to correspond to the plurality of distributed regions, respectively. The searching processing executing unit 112 detects the work position by performing the pattern matching processing by using the reference image in the plurality of searching regions which are set by the priority searching region setting unit 115.

In the processing of the matching position analyzing unit 114, which is one example of the distribution searching process, the matching position analyzing unit 114 detects a predetermined number of the work positions by performing the pattern matching processing by using the reference image in the continuous searching regions, on the predetermined number of input images. The priority searching region setting unit 115 determines the distribution of the work positions on the input image, based on the predetermined number of the detected work positions.

(Priority Searching Processing)

Figure 10:
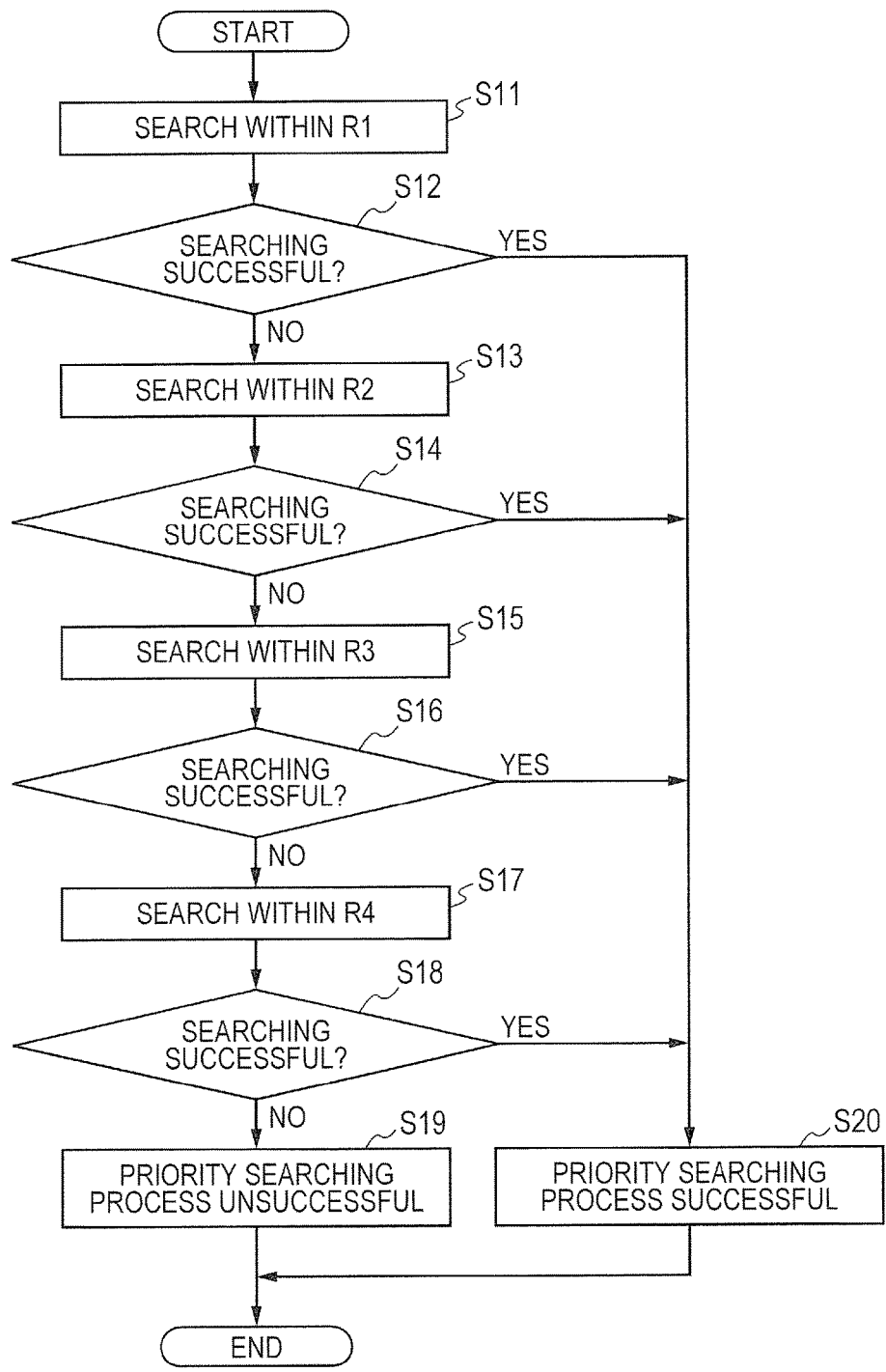
FIG. 10 is a flow chart of a priority searching processing.

FIG. 10 is a flow chart of priority searching processing. When the distributions D1, D2, D3 and D4 have been acquired by the normal searching processing which has been already performed, as is illustrated in FIG. 4, the computer 150 sets the priority searching regions R1, R2, R3 and R4 so as to correspond to the distributions D1, D2, D3 and D4.

The computer 150 calculates the barycentric position $\mu 1$ of all the matching positions which belong to the distribution D1, and a standard deviation $\sigma 1$ of distances $\delta$ between the barycentric position $\mu 1$ and each matching position. Then, the computer 150 sets a circular region of which the center is $\mu 1$ and the radius is $5\sigma 1$, as the priority searching region R1. Similarly, the computer 150 sets the priority searching regions R2, R3 and R4 for the distributions D2, D3 and D4.

After having set the priority searching regions R2, R3 and R4, the computer 150 executes the priority searching processing in the priority searching regions R1, R2, R3 and R4. The computer 150 sequentially performs the pattern matching processing on the set priority searching regions R1, R2, R3 and R4 with the use of the reference image, and searches the matching position and the matching angle.

As is illustrated in FIG. 10, the computer 150 searches a work position in the priority searching region R1 (S11). When having been capable of detecting the work position which coincides with that in the reference image in the priority searching region R1 (Yes in S12), the computer 150 considers that the priority searching processing has succeeded, and ends the priority searching processing (S20).

When having been uncapable of detecting the position which coincides with that in the reference image in the priority searching region R1 (No in S12), the computer 150 searches the inside of the priority searching region R2 (S13). When having been capable of detecting a position which coincides with that in the reference image in the priority searching region R2 (Yes in S14), the computer 150 considers that the priority searching processing has succeeded, and ends the priority searching processing (S20).

When having been uncapable of detecting the position which coincides with that in the reference image in the priority searching region R2 (No in S14), the computer 150 searches the inside of the priority searching region R3 (S15). When having been capable of detecting a position which coincides with that in the reference image in the priority searching region R3 (Yes in S16), the computer 150 considers that the priority searching processing has succeeded, and ends the priority searching processing (S20).

When having been uncapable of detecting the position which coincides with that in the reference image in the priority searching region R3 (No in S16), the computer 150 searches the inside of the priority searching region R4 (S17). When having been capable of detecting a position which coincides with that in the reference image in the priority searching region R4 (Yes in S18), the computer 150 considers that the priority searching processing has succeeded, and ends the priority searching processing (S20).

When having been uncapable of detecting a position which coincides with that in the reference image in the priority searching region R4 (No in S18), the computer 150 records a failure of the priority searching processing (S19).

The searching processing executing unit 112 executes the priority searching processing. In the priority searching processing, the searching processing executing unit 112 sequentially searches the positions of the reference images in the priority searching regions; and at the time when having been capable of detecting the position which coincides with that in the reference image, in other words, when having succeeded in the searching, considers that the priority searching processing has succeeded, and ends the processing. In addition, when having failed in searching in all the priority searching regions, the searching processing executing unit 112 considers that the priority searching processing has failed, and ends the processing.

The searching processing executing unit 112 searches the inside of the priority searching region R1 on the input image. When having been capable of detecting the position which coincides with that in the reference image in the priority searching region R1, the searching processing executing unit 112 considers that the priority searching processing has succeeded, and ends the processing. When having been uncapable of detecting the position, the searching processing executing unit 112 performs searching in the inside of the priority searching region R2, next. The searching processing executing unit 112 repeats this operation until finishing searching all the priority searching regions, in order to learn whether or not the position which coincides with that in the reference image can be detected. When having been uncapable of detecting the position which coincides with that in the reference image in the stage in which having finished searching all the priority searching regions, the searching processing executing unit 112 considers that the priority searching processing has failed, and ends the processing.

Specifically, in the priority searching processing which is one example of the first detecting process, the computer 150 performs the pattern matching processing in the priority searching regions R1, R2, R3 and R4 which are one examples of the first searching region. In addition, when having been uncapable of detecting the work position in the priority searching processing, the computer 150 executes the normal searching processing which is one example of the second detecting process. In the normal searching processing, the computer 150 performs the pattern matching processing in the normal searching region UE except for the priority searching regions R1, R2, R3 and R4.

Comparative Example

The pattern matching processing is used as a method for detecting a position of an object to be detected in a single searching region which is set on the input image, in a field of an image processing of a wide field of a text image processing, facial recognition, a production apparatus and the like.

In the conventional pattern matching processing, the pattern matching apparatus repeats the calculation of the similarity to the reference image in the whole searching region, accordingly the number of calculations becomes enormous, and a processing time of the pattern matching processing is extended. In the field of the production apparatus, the image processing time directly affects the manufacturing cost of the product, accordingly the processing time is strongly required to be shortened more than now, and there is a strong need for increasing the speed of the processing. For this reason, the speed needs to be increased from various viewpoints.

Then, in the comparative example, in the robot apparatus 10 of Embodiment 1, the searching region is set at a narrow region which regards the mode of the past matching positions as the center, as is described in Patent document 1, and the pattern matching processing in the outside of the searching region is omitted.

However, in the comparative example, when data of the past matching positions have a multi-peak distribution in which the data concentrate on a plurality of portions and are dispersed, the pattern matching processing is vainly performed in the middle region between a plurality of portions, in many cases. Because of this, there is a problem that the speed of the pattern matching processing is not sufficiently increased.

As is illustrated in FIG. 4, in the robot apparatus 10, the matching positions form the multi-peak distribution. Because of this, when the mode and the dispersion are simply determined from the whole distribution, and the searching region is thereby determined, the searching region becomes a circular shape which contains all the distributions, and practically results in containing also a region in which the matching positions are not distributed. In other words, the searching region results in being set so as to be vainly wide, and accordingly the increase in the speed has been insufficient.

Effect of Embodiment 1

In Embodiment 1, the image processing apparatus can analyze the distribution of the matching positions, and set the requisite minimum of the priority searching region in consideration of the dispersion in each distribution; and accordingly can set the searching region to be narrower than that in conventional one, and can detect the position of the reference image from the input image in a shorter time period.

In Embodiment 1, the image processing apparatus can search the inside of the normal searching region which a user has set, when having failed in the searching of the inside of the priority searching region, and accordingly even if there is no correct position in the inside of the priority searching region, does not fail in matching, as long as there is the correct position in the normal searching region.

In Embodiment 1, the image processing apparatus analyzes the distribution of the matching positions, and determines the priority searching region for each of the distributions; and accordingly even when the distribution of the matching position is multi-peak, can limit the searching region to a narrower range than that in a conventional one. Because of this, the image processing apparatus can detect the position of the reference image from the input image in a shorter time period.

In Embodiment 1, the image processing apparatus sets the priority searching regions R1, R2, R3 and R4 on the input image, which are one examples of the plurality of searching regions so as to correspond to the plurality of distributed regions, respectively. Then, the image processing apparatus performs the pattern matching processing on the priority searching regions R1, R2, R3 and R4 by using the reference image to detect the work position. Because of this, after having started the priority searching processing, the image processing apparatus can omit the pattern matching processing in the normal searching region UE from which the priority searching regions R1, R2, R3 and R4 are removed.

In Embodiment 1, the image processing apparatus sequentially selects the plurality of searching regions and performs the pattern matching processing thereon, and ends the pattern matching processing in the searching region in which the matching score has reached the normal score threshold value that is one example of the evaluation reference. Because of this, the image processing apparatus can omit the pattern matching processing in the searching region that comes later than the searching region in which the score has reached the normal score threshold value.

In Embodiment 1, the image processing apparatus selects the searching region in descending order of a frequency at which the work position is detected in the pattern matching processing that has been executed in past times. In the normal searching processing, the image processing apparatus searches the work position in the searching region in descending order from the searching region in which more matching positions are distributed. Because of this, such a possibility is enhanced that the image processing apparatus finds the searching region which has reached the normal score threshold value in an early stage and can omit the pattern matching processing in more searching regions. Then, the image processing apparatus considers that priority searching processing has succeeded at an early stage, and can end the processing.

In Embodiment 1, when having been uncapable of detecting the work position in the priority searching regions R1, R2, R3 and R4 which are one examples of the first searching region, the image processing apparatus performs the pattern matching processing in the normal searching region UE which is one example of the second searching region, and detects the work position there. Because of this, even when having been uncapable of detecting the work position in the priority searching regions R1, R2, R3 and R4, the image processing apparatus detects the work position in the input image, and does not need to stop the robot apparatus 10.

In Embodiment 1, the image processing apparatus sets the priority searching regions R1, R2, R3 and R4 so as to correspond to the distribution of the work positions, which is determined by the normal searching processing that is one example of the distribution searching process. Because of this, the image processing apparatus can set the priority searching regions R1, R2, R3 and R4 in which the excess and shortage due to the combination among the type of the work 200, the imaging condition and the reference image at the time are little.

In Embodiment 1, the image processing apparatus discriminates a predetermined number of the work positions based on a distance between the work positions, determines a group of the plurality of work positions, and sets one priority searching region so as to correspond to a determined group one by one. Because of this, the image processing apparatus can set the priority searching regions R1, R2, R3 and R4 in which the work position detected by the priority searching processing is approximately equally dispersed, and in which the excess and shortage are little.

In Embodiment 1, the image processing apparatus sets the plurality of searching regions, based on an average value and the standard deviation of the work positions which have been detected on the predetermined number of input images which go back to the past. Because of this, even when the imaging condition has been changed during the continuous processing for the work 200, the image processing apparatus adjusts the priority searching regions R1, R2, R3 and R4 to a state in which the excess and shortage are little, and can suppress the occurrence of an error.

Embodiment 2

In Embodiment 1, each of the parameters of the score threshold value, the searching angle and the searching scale, which will be described later, has been a fixed value that is set by a user. On the other hand, in Embodiment 2, each of the parameters of the score threshold value, the searching angle and the searching scale is automatically adjusted as a score threshold value at priority searching, an angle of priority searching and a scale of priority searching, after the priority searching processing has started from initial values. Configurations and controls other than the above description are the same as those in Embodiment 1, and accordingly, in FIG. 11, configurations which are common to those in Embodiment 1 are designated by the same reference numerals as in FIG. 5, and overlapping description will be omitted.

(Prior Processing)

Figure 11:
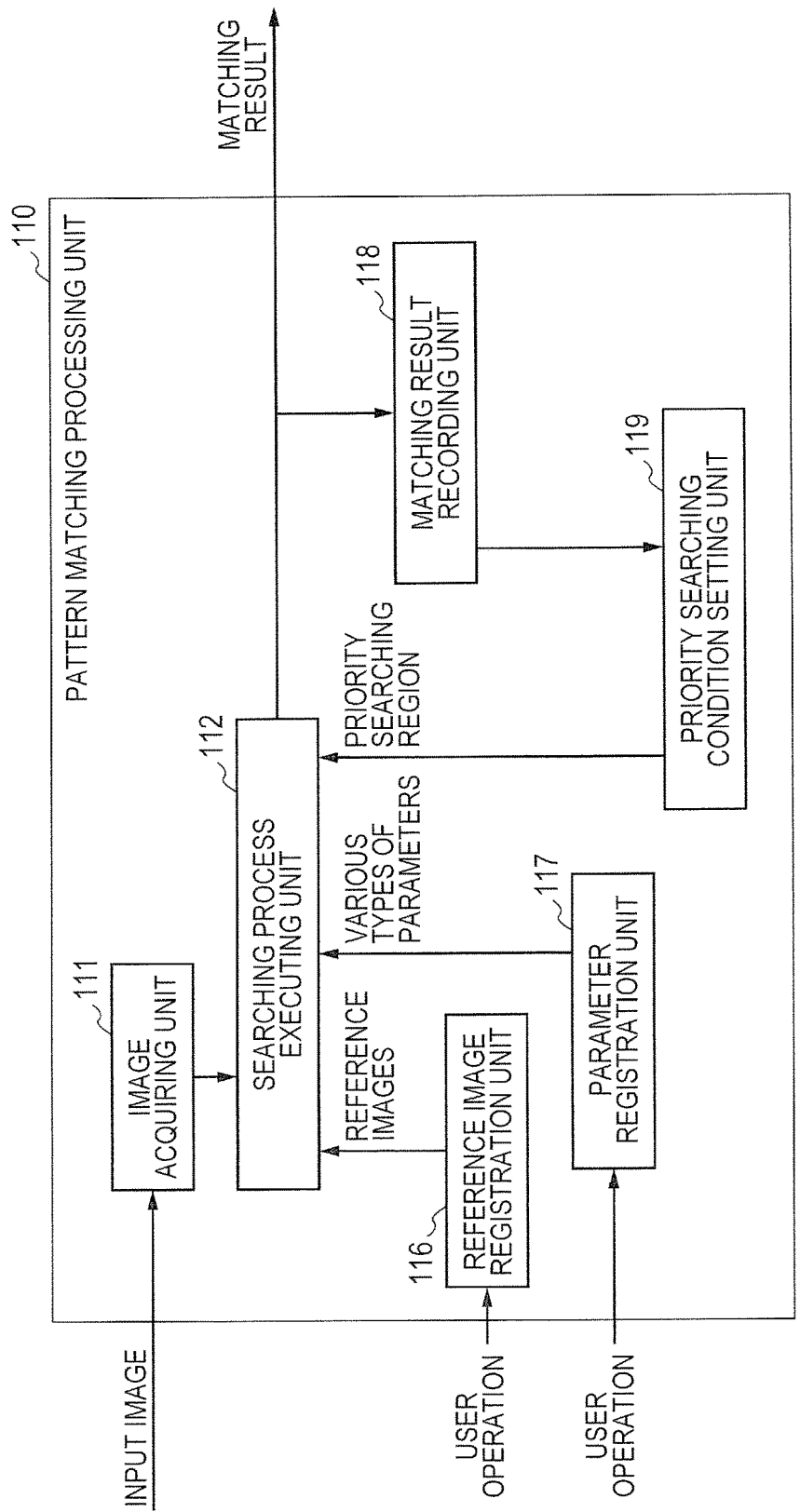
FIG. 11 is a functional block diagram of pattern matching processing of Embodiment 2.

FIG. 11 is a functional block diagram of the pattern matching processing in Embodiment 2. Before the start of the pattern matching processing, the reference image registration unit 116 and the parameter registration unit 117 perform the prior processing for the pattern matching processing unit 110, and set a reference image, a parameter and the like which are necessary for the pattern matching processing. The user can change a part or all of the parameters through the reference image registration unit 116 and the parameter registration unit 117.

As is illustrated in FIG. 7, the user selects an appropriate reference image according to the type of the work 200 and the imaging condition, from the plurality of reference images which are prepared in the reference image registration unit 116 beforehand, and registers the selected reference image in the reference image registration unit 116 (S1).

The user selects a selection choice necessary for the pattern matching processing which is executed in the searching processing executing unit 112, from a plurality of selection choices of parameters which are prepared by the parameter registration unit 117 beforehand, and registers the selection choice in the parameter registration unit 117 (S2).

(Pattern Matching Processing)

Figure 12:
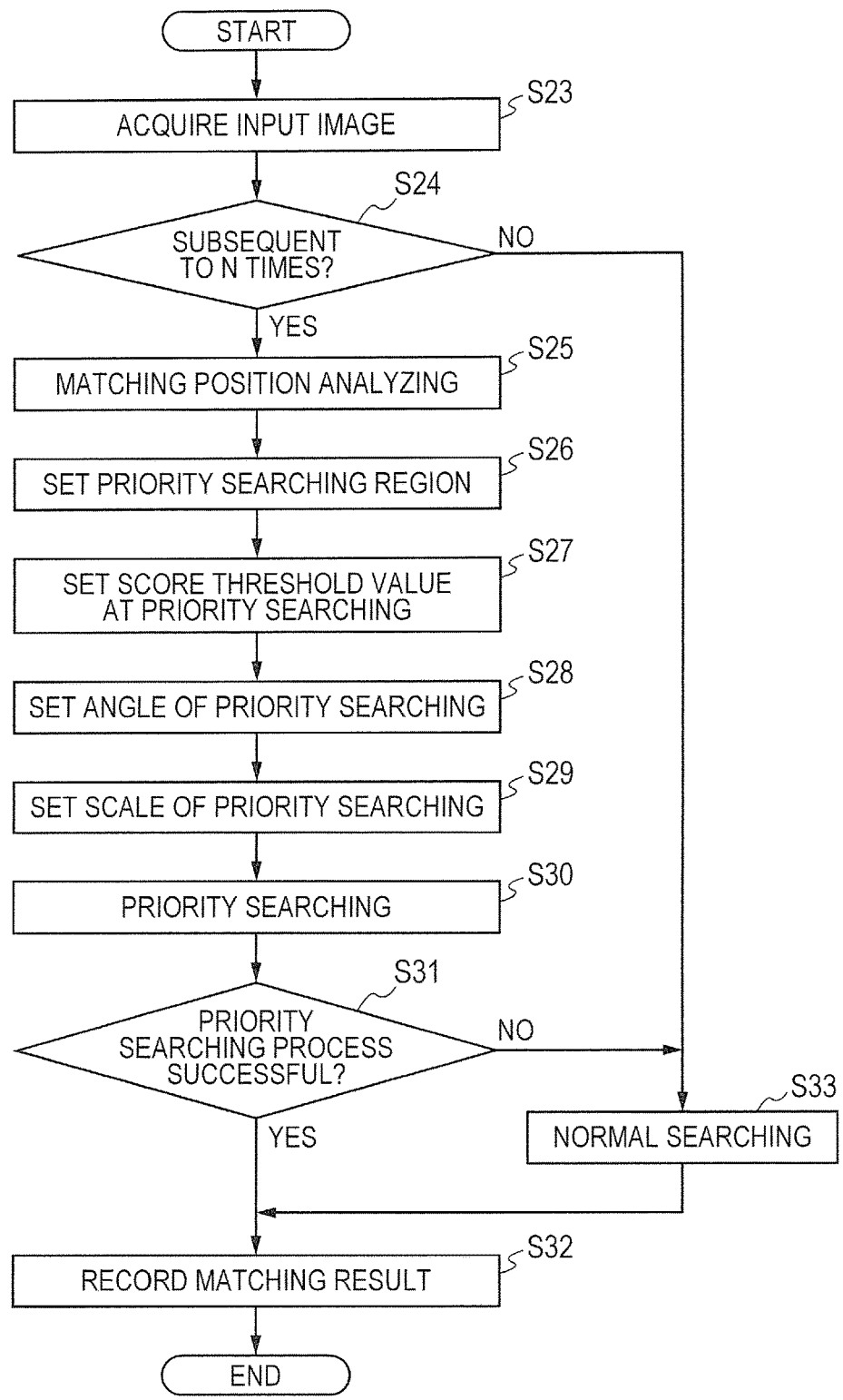
FIG. 12 is a flow chart of the pattern matching processing of Embodiment 2.

FIG. 12 is a flow chart of the pattern matching processing in Embodiment 2. As is illustrated in FIG. 12 with reference to FIG. 6, the computer 150 acquires the imaged image of the work 200 (S23).

The computer 150 determines whether or not the present number m of times, at which the computer 150 has acquired the work position, exceeds the number N of past information references (S24). Until the present number m of times exceeds the number N of past information references (No in S24), the computer 150 continues the normal searching processing for searching the work position in the whole normal searching region UE illustrated in FIG. 4 (S33).

When the present number m of times exceeds the number N of past information references (Yes in S24), the computer 150 executes the analysis of the distribution state of the work positions (S25). The computer 150 sets the priority searching regions R1, R2, R3 and R4, based on the analysis result of the distribution state of m pieces of the work positions (S26).

The computer 150 executes the processing of setting a score threshold value at priority searching which will be described later, and sets the score threshold value at priority searching (S27). The computer 150 executes the processing of setting an angle of priority searching, which will be described later, and sets the angle of the priority searching (S28).

The computer 150 executes the processing of setting a scale of priority searching, which will be described later, and sets the scale of the priority searching (S29). The computer 150 executes the pattern matching processing which uses the score threshold value at the priority searching, the angle of the priority searching, the scale of the priority searching and the reference image K, as parameters, in the inside of the priority searching regions R1, R2, R3 and R4 (S30).

When having succeeded in the pattern matching processing in the inside of the priority searching regions R1, R2, R3 and R4 (Yes in S31), the computer 150 records the coordinate positions x and y and the inclination angle θ at which the computer 150 has succeeded in the pattern matching processing, as the work position (S32).

When not having succeeded in the pattern matching processing in inside of the priority searching regions R1, R2, R3 and R4 (No in S31), the computer 150 moves to the normal searching processing (S33). When not having succeeded in the pattern matching processing even in the normal searching processing, the computer 150 considers that the searching processing has failed, stops the robot apparatus 10, and outputs an alarm.

(Matching Result Recording Processing)

As is illustrated in FIG. 11, a matching result recording unit 118 records the coordinate positions x and y, a matching score t, a matching angle a and a matching scale s at the time when the pattern matching processing unit has succeeded in the pattern matching processing, up to the results of the latest past N times. At the time of recording, the matching position recording unit 118 performs the FIFO (First In First Out) processing, and when recording the new data xm, ym, tm, am and sm, deletes the older data xm-N, ym-N, tm-N, am-N and sm-N than the number N of past information references.

The priority searching condition setting unit 119 sets the score threshold value at the priority searching, the angle of the priority searching and the scale of the priority searching, by using the matching score ti (i=m-N, . . . , m-1), the matching angle ai (i=m-N, . . . , m-1) and the matching scale si (i=m-N, . . . , m-1) which are recorded in the matching result recording unit 118. These set values are used at the time of the priority searching.

The searching processing executing unit 112 executes the priority searching processing. In the priority searching processing, the searching processing executing unit 112 searches the position and the inclination angle of the reference image on the input image, by using the score threshold value at the priority searching, the angle of the priority searching and the scale of the priority searching.

(Score Threshold Value at Priority Searching)

When the score threshold value is set to be low, the pattern matching processing succeeds even when some noises and some changes of illumination have occurred. However, when the score threshold value is low, many candidate points remain in the process of searching, accordingly the number of calculations increases, and a time period for the pattern matching processing is extended.

Then, in Embodiment 2, the priority searching condition setting unit adjusts the score threshold value by using the accumulated data of the matching score, and prevents the score threshold value from being set to be low. As is illustrated in FIG. 11, in the processing of the priority searching condition setting unit, which is one example of an evaluation reference setting process, the priority searching condition setting unit sets the score threshold value at the priority searching, based on the average value and the standard deviation of the matching scores in the pattern matching processing on a predetermined number of input images which go back to the past. The priority searching condition setting unit 119 acquires the matching score information ti (i=m-N, . . . , m-1) which corresponds to N pieces of the latest past information references, from the matching result recording unit 118. Then, the priority searching condition setting unit 119 calculates an arithmetic average μt and a standard deviation σt of all the matching scores, and sets μt−5σt as the score threshold value at the priority searching.

(Angle of Priority Searching)

When the searching angle is set to be large, even when the work 200 is greatly inclined on the imaged image, the pattern matching processing can be made to succeed, but many candidate points remain in the process of searching; and accordingly the number of calculations increases, and the time period for the pattern matching processing is extended.

Then, in Embodiment 2, the priority searching condition setting unit adjusts the searching angle by using the accumulated data of the matching angle, and prevents the searching angle from being set to be large. As is illustrated in FIG. 11, in the processing of the priority searching condition setting unit, which is one example of the angle range setting process, the priority searching condition setting unit sets the searching angle, based on the average value and the standard deviation of the matching angles in the pattern matching processing on the predetermined number of input images which go back to the past. The priority searching condition setting unit 119 acquires the matching angle information ai (i=m-N, . . . , m-1) which corresponds to N pieces of the latest past information references, from the matching result recording unit 118. Then, the priority searching condition setting unit 119 calculates an arithmetic average μa and a standard deviation σa of all the matching angles, and sets a range of the angle of the priority searching for μa−5σa to μa+5σa.

(Scale of Priority Searching)

When the searching scale is set to be large, even when the work 200 is imaged to be slightly expanded or shrunk on the imaged image, the work position can be detected. However, many candidate points remain in the process of searching, accordingly the number of calculations increases, and the time period for the pattern matching processing is extended.

Then, in Embodiment 2, the priority searching condition setting unit adjusts the searching scale by using the accumulated data of the matching scales, and prevents the searching scale from being set to be large. As is illustrated in FIG. 11, in the processing of the priority searching condition setting unit, which is one example of the expansion and shrinkage range setting process, the priority searching condition setting unit sets the expansion and shrinkage range of the reference image, based on the average value and the standard deviation of the matching scales in the pattern matching processing on the predetermined number of input images which go back to the past. The priority searching condition setting unit 119 acquires the matching scale information si (i=m-N, . . . , m-1) which corresponds to N pieces of the latest past information references, from the matching result recording unit 118. Then, the priority searching condition setting unit 119 calculates an arithmetic average μs and a standard deviation σs of all the matching scales, and sets a range of the scale of the priority searching for μs−5σs to μs+5σs.

Effect of Embodiment 2

In Embodiment 2, the image processing apparatus sets the score threshold value at the priority searching, at the maximal value in consideration of dispersion, and thereby the number of candidate points can be reduced that are objects for which the similarity is calculated in the pattern matching processing.

In Embodiment 2, the image processing apparatus sets the angle of the priority searching at the minimal value in consideration of dispersion, and thereby the number of candidate points can be reduced that are objects for which the similarity is calculated in the pattern matching processing.

In Embodiment 2, the image processing apparatus sets the scale of the priority searching at the minimal value in consideration of dispersion, and thereby the number of candidate points can be reduced that are objects for which the similarity is calculated in the pattern matching processing.

OTHER EMBODIMENTS

In Embodiments 1 and 2, the image processing apparatus has performed the pattern matching processing on the edge image of the imaged image by using the reference image of the edge image. However, the method for determining the work position on the imaged image is not limited to such pattern matching processing. The method may be any method as long as the method is a known technique such as a matching technique using brightness information and a matching technique using edge information. At this time, the reference image varies depending on the searching method, but may be a template image that is a part of a rectangular region cut out from the reference image, or may also be an image to which the edge information of an object to be detected has been converted.

In Embodiments 1 and 2, embodiments of the robot apparatus have been described. However, the present invention may be carried out by a measurement apparatus, an inspection apparatus and a production apparatus other than the robot apparatus, which are provided with the image processing apparatus.

In Embodiments 1 and 2, the radius of the circular region of the priority searching regions R1, R2, R3 and R4 has been set at 5 times as large as the standard deviation of the distances from the barycentric position $\mu1$ of the matching positions in each of the regions to the matching position. However, the radius of the circular region of the priority searching regions R1, R2, R3 and R4 may be any times as large as the standard deviation $\sigma$ of the distances from the barycentric position $\mu1$ to the matching position, such as $3\sigma$ and $\sigma$. As is illustrated in FIG. 4, it is acceptable to set one priority searching region as a circular region which regards the barycenter of the work positions in one group of the work positions as the center, and has the radius of 1 time or more and 6 times or less than the standard deviation of the distances from the barycenter in one group of the work positions to each of the work positions.

In Embodiment 1, as for the order of the regions to be searched in the priority searching processing, the searching region has been selected in descending order from the regions in which more matching positions are distributed in the normal searching processing. However, the order may be determined to be the order of the numbers in FIG. 4 (R1, R2, R3 and R4) regardless of the number of the matching positions in the searching region. In addition, the order may be corrected continuously so that the priority searching processing executing unit continues accumulation of the matching positions even after the priority searching processing has started, and searches the searching region in descending order from the region in which more matching positions are distributed in the priority searching processings of approximately 20 times which go back to the past. This is because the image processing apparatus considers that the priority searching processing has succeeded at an earlier stage, and can end the processing.

In Embodiment 1, the computer 150 has ended the searching at the priority searching region in which the matching score has reached the threshold value in the priority searching processing. However, the computer 150 may determine the matching scores in all of the priority searching regions, and may determine a point at which the score is highest, as the matching position. Specifically, the computer 150 performs the pattern matching processing in the sum region in which a plurality of searching regions are added, and detects a position at which the matching score becomes highest in the sum region, as the work position. This is because the pattern matching processing time is extended but the accuracy is enhanced.

In Embodiment 1, the case has been described where the matching positions are divided into four distributions, but the number of the distributions is not limited to four, and may be any number.

In Embodiment 1, a hierarchy clustering method has been used, but in the case where it is already known how many distributions the matching positions are divided into, it is acceptable to cluster by using a Kmeans method which is a non-hierarchy clustering method.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-171653, filed Sep. 1, 2015, which is hereby incorporated by reference herein in its entirety.

What is claimed is:

1. An image processing method by which an arithmetic operation unit performs image processing on an input image in which work positions in the input image of a work held by a holding unit imaged by an imaging unit appear preferentially in a plurality of distributed regions on the input image, comprising:
a setting process in which the arithmetic operation unit sets searching regions on the input image so as to correspond to the plurality of distributed regions, respectively; and
a detecting process in which the arithmetic operation unit detects the work position by performing pattern matching processing by using a reference image, in a plurality of searching regions that have been set in the setting process, wherein,
in the detecting process, the arithmetic operation unit determines an evaluation value of pattern matching, every time the pattern matching processing is performed.

2. The image processing method according to claim 1, wherein in the detecting process, the arithmetic operation unit sequentially selects the plurality of searching regions, performs the pattern matching processing, and ends the pattern matching processing at the searching region in which the evaluation value has reached an evaluation reference.

3. The image processing method according to claim 2, wherein in the detecting process, the arithmetic operation unit selects a searching region in a descending order of frequency at which the work position is detected in the pattern matching processing that has been executed in past times.

4. The image processing method according to claim 1, wherein in the detecting process, the arithmetic operation unit performs the pattern matching processing in a sum region in which the plurality of searching regions are added, and detects a position at which the evaluation value becomes highest in the sum region, as the work position.

5. The image processing method according to claim 1, further comprising a second detecting process in which
when the detecting process is set to be a first detecting process, the plurality of searching regions are set to be first searching regions, and regions other than the plurality of searching regions on the input image are set to be second searching regions, the arithmetic operation unit detects the work position by performing the pattern matching processing in the second searching region, in the case where the arithmetic operation unit cannot have detected the work position in the first detecting process.

6. The image processing method according to claim 1, further comprising a distribution searching process in which the arithmetic operation unit detects a predetermined number of work positions by performing the pattern matching processing by using the reference image in continuous searching regions, on the predetermined number of input images, and determines a distribution of the work positions on the input images, based on the detected predetermined number of the work positions, wherein
in the setting process, the arithmetic operation unit sets the plurality of searching regions so as to correspond to the distribution of the work positions, which is determined in the distribution searching process.

7. The image processing method according to claim 6, wherein in the setting process, the arithmetic operation unit discriminates the predetermined number of work positions based on a distance between the work positions, determines a group of the plurality of work positions, and sets one searching region so as to correspond to the determined group one by one.

8. The image processing method according to claim 7, wherein in the setting process, the arithmetic operation unit sets the one searching region as a circular region which regards a barycenter of the work positions in the one group as a center, and has a radius of 1 time or more and 6 times or less than a standard deviation of distances from the barycenter in the one group to each of the work positions.

9. The image processing method according to claim 1, further comprising a searching region setting process in which the arithmetic operation unit sets the plurality of searching regions, based on an average value and standard deviation of the work positions which have been detected on a predetermined number of input images that go back to the past, wherein,
in the detecting process, the arithmetic operation unit performs the pattern matching processing in the plurality of searching regions which have been set in the searching region setting process.

10. The image processing method according to claim 1, further comprising an evaluation reference setting process in which the arithmetic operation unit sets an evaluation reference of the evaluation value, based on an average value and standard deviation of the evaluation values in the pattern matching processing of a predetermined number of input images which go back to the past, wherein,
in the detecting process, the arithmetic operation unit uses the evaluation reference which has been set in the evaluation reference setting process.

11. The image processing method according to claim 1, further comprising an angle range setting process in which the arithmetic operation unit sets an angle range in which the pattern matching processing is performed at respective positions of the searching regions, based on the predetermined number of data of inclination angles between the input images and the reference image, which have been detected in the pattern matching processing of a predetermined number of input images which go back to the past, wherein,
in the detecting process, the arithmetic operation unit uses the angle range which has been set in the angle range setting process.

12. The image processing method according to claim 1, further comprising an expansion shrinkage range setting process in which the arithmetic operation unit sets an expansion shrinkage range of the reference image at the time when the pattern matching processing is performed at respective positions of the searching regions, based on the predetermined number of data of the expansion shrinkage ranges of the reference image, in the pattern matching processing of a predetermined number of input images which go back to the past, wherein,
in the detecting process, the arithmetic operation unit uses the expansion shrinkage range which has been set in the expansion shrinkage range setting process.

13. The image processing method according to claim 1, further comprising an imaging process in which the arithmetic operation unit makes the imaging unit image the work every time the arithmetic operation unit makes the holding unit hold the work, and acquires the input image.

14. A non-transitory recording medium having a program recorded therein for making a computer execute the image processing method according to claim 1.

15. An image processing apparatus that subjects an input image to image processing, in which work positions in the input image of a work held by a holding unit imaged by an imaging unit appear preferentially in a plurality of distributed regions on the input image, comprising an arithmetic operation unit which executes: a setting process of setting searching regions on an input image so as to correspond to the plurality of distributed regions, respectively; and a detecting process of detecting the work position by performing pattern matching processing by using a reference image in the plurality of searching regions which have been set in the setting process, wherein, in the detecting process, the arithmetic operation unit determines an evaluation value of pattern matching, every time the pattern matching processing is performed.

16. A robot apparatus comprising:
- a multi-joint robot including an image processing apparatus that subjects an input image to image processing, in which work positions in the input image of a work held by a holding unit imaged by an imaging unit appear preferentially in a plurality of distributed regions on the input image, comprising an arithmetic operation unit which executes: a setting process of setting searching regions on an input image so as to correspond to the plurality of distributed regions, respectively; and a detecting process of detecting the work position by performing pattern matching processing by using a reference image in the plurality of searching regions which have been set in the setting process, wherein, in the detecting process, the arithmetic operation unit determines an evaluation value of pattern matching, every time the pattern matching processing is performed,
- wherein the multi-joint robot includes the holding unit, and the robot apparatus includes the imaging unit, and
- wherein the arithmetic operation unit executes an imaging process to make the imaging unit image the work every time the arithmetic operation unit makes the holding unit hold the work, and to acquire the input image, and
- wherein, in the setting process, the plurality of searching regions are set on the input image acquired in the imaging process.

* * * * *